United States Patent [19]

van Boven et al.

[11] 4,277,166

[45] Jul. 7, 1981

[54] EXPOSURE DEVICE

[75] Inventors: Petrus L. M. van Boven, Velden; Leon M. W. Winthaegen, Maasbree, both of Netherlands

[73] Assignee: Océ-Nederland B.V., Venlo, Netherlands

[21] Appl. No.: 71,016

[22] Filed: Aug. 30, 1979

[30] Foreign Application Priority Data

Sep. 1, 1978 [NL] Netherlands ........................ 7808977

[51] Int. Cl.³ ........................ G03G 15/00; G03B 27/54

[52] U.S. Cl. .................................... 355/67; 355/3 R; 362/17; 362/297

[58] Field of Search ................ 355/3 R, 67, 69, 3 FU; 362/3, 16, 17, 297, 346

[56] References Cited

U.S. PATENT DOCUMENTS

| | | | |
|---|---|---|---|
| 2,205,860 | 6/1940 | Olds | 362/17 |
| 2,913,569 | 11/1959 | Edelstein | 362/17 |
| 3,270,194 | 8/1966 | Lee | 355/67 |
| 3,532,424 | 10/1970 | Miles | 362/346 X |

*Primary Examiner*—Fred L. Braun

*Attorney, Agent, or Firm*—Albert C. Johnston

[57] ABSTRACT

Transverse areas lying between image areas of a moving photoconductive element can be discharged efficiently with sharp demarcations between the respective areas by an exposure device in which a flash lamp is disposed perpendicularly between two elongate side walls of a reflective housing having an open side and an elongate light-reflecting rear wall. A protective cover fixed near the lamp at the open side prevents direct radiation of the element from the lamp. Scatter of the reflected light is prevented by partitions fixed in parallel to the side walls in end regions of the housing space.

9 Claims, 2 Drawing Figures

EXPOSURE DEVICE

This invention relates to an exposure device of a kind that comprises a light-source, an elongate reflecting rear wall, two elongate side walls and an elongate open side.

Exposure devices of the kind mentioned are used for instance in electrophotographic copying apparatus for the discharging of edge portions of a photoconductive element that do not take part in the formation of an image. In this way wastage of developer and scattering of developer through the copying apparatus are prevented. The edge discharging exposure devices are placed with an open side thereof close to the surface of the photoconductive element in order that the area to be discharged can be limited exactly.

Incandescent lamps generally are used for discharging the edge portions parallel to the direction of transport of the photoconductive element, because in this case a strip is discharged continuously, or at least during long intervals, along both sides of the photoconductive element during the operation of the copying apparatus. Incandescent lamps cannot be used, however, for discharging the strips on a moving photoconductive element that lie between the image areas, so transverse to the transport direction of the element. Since incandescent lamps neither excite immediately to the required intensity nor extinguish immediately, cross strips discharged by their use are not sharply demarcated.

The problem of discharging transverse areas on the moving photoconductive element can be met by the use of a tubular fluorescent lamp arranged perpendicularly to the transport direction of the photoconductive element as described in U.K. Pat. No. 1 230 526. According to that specification the fluorescent lamp is kept in a standby state by being continuously connected to current supply sources for the glow wires and the electrodes. The voltage maintained over the electrodes is too low for spontaneous ignition of the lamp, but can be raised immediately to full-light intensity by an auxiliary voltage. Such a construction, however, has the disadvantage that current is consumed continuously for the glow wires of the lamp.

The object of the present invention is to provide an exposure device that does not have the above-mentioned disadvantage but which yields a sharply demarcated discharge of the transverse areas, or cross strips, between moving image areas of the photoconductive element.

The exposure device according to the invention comprises a light source, an elongate reflecting rear wall, two elongate side walls and an elongate open side, and is characterized in that the light source is a flash lamp which is fixed between and perpendicularly to the two side walls; a protective cover which prevents direct light radiation is provided at the open side of the exposure device near the lamp; and partitions are mounted in the exposure device in parallel to the side walls.

The exposure device so constituted is placed with its open side close to but without touching the photoconductive element to be discharged. The partitions between the side walls prevent reflected light of the lamp from scattering between the side walls and the photoconductive element, thus assuring a sharp and straight demarcation of the image areas. The sharpness of the demarcation can be improved further by providing the partitions and the inwardly directed sides of the side walls with a mat black surface.

The reflecting rear wall preferably has a diffusely reflecting surface in order to ensure a uniform exposure of the whole surface at the open side of the exposure device. The precise form of this reflecting wall is not critical; a cross section of it parallel to the side walls can be substantially parabolic or circular, but an assembly of several planes which together more or less approach a circular or parabolic form is also very suitable. If so desired, a small central region of the reflecting wall situated close to the flash lamp may be made specular and may protrude in such a way that it will direct an extra quantity of light toward both ends of the reflector-housing.

The protective cover of the flash lamp may be troughlike or cylindrical in form. This cover prevents the light of the lamp from striking the photoconductive element directly, with too high an intensity, at locations just beneath the lamp.

With the use of the exposure device according to the invention it would be possible to discharge the whole area of a zone between two image areas of the moving photoconductive element by the application of a large number of flashes one after another. This, however, imposes high requirements on the capacity of the flash unit. A much simpler execution is sufficient when the corona used for charging the photoconductive element is switched off at exact moments. In that case charged flanks are maintained only at the leading and trailing edges of the image areas, so that it is only necessary to flash twice for discharging a leading and a trailing edge between two image areas.

The invention will be further understood from the following description and the accompanying drawing of an illustrative embodiment.

Figure 1:
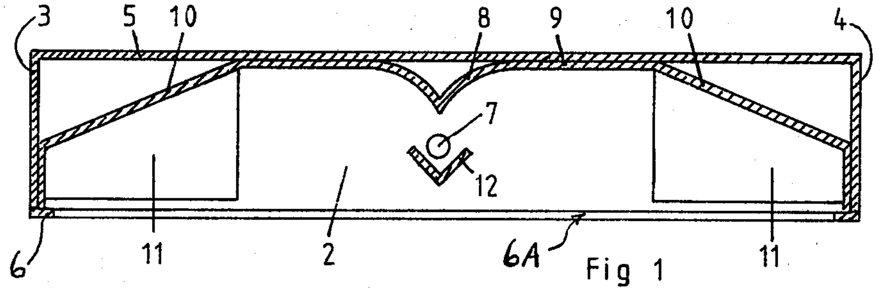
FIG. 1 is a schematic cross sectional view of an embodiment of the invention, taken along the line I—I' of FIG. 2.
Figure 2:
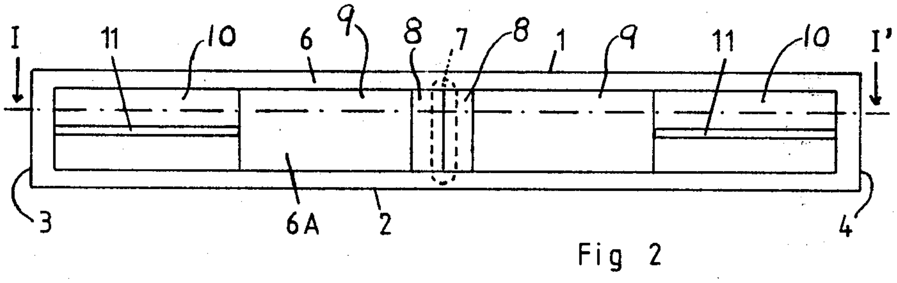
FIG. 2 is an elevational view of the open side of the same embodiment.

The illustrated exposure device comprises a reflective housing having two elongate rectangular side walls 1 and 2 which are lacquered mat black at the inside. These side walls are joined together by two small rectangular end walls 3 and 4 and an elongate rectangular rear wall 5. The fourth long side of the housing is covered off over a small part of its area, at the edges only, by a mask 6 bordering a large rectangular opening 6A.

A short flash lamp 7 is mounted between the side walls 1 and 2, perpendicularly to these walls and midway of their length. The long rectangular rear wall 5 is provided at the inside with a reflecting surface which, viewed in each length direction from the flash lamp, consists of three portions or regions, namely, a specular concavely sloped portion 8 which directs the light of the lamp toward the pertaining end of the reflective housing, a diffusely reflecting flat portion 9 which rests against the wall 5, and a diffusely reflecting flat portion 10 which makes an obtuse angle with the flat portion 9.

A mat black lacquered partition 11 is mounted on each flat portion 10 in parallel to the side walls 1 and 2, preferably midway between these side walls. A small trough-like protective cover 12 is installed between the flash lamp 7 and the open side of the reflector housing in parallel relation to the lamp. This cover is so formed and arranged relative to the lamp 7 that its shadow reaches just to the ends of the open side of the reflector housing.

We claim:

1. An exposure device for discharging limited transverse areas of a moving photoconductive element, comprising an elongate light reflecting housing adapted to be positioned transverse and close to said element and a light source in said housing, said housing comprising an elongate rear wall, two oppositely disposed elongate side walls and a fixed limited elongate opening at the housing front to overlie said element, said light source comprising a flash lamp disposed between said side walls substantially perpendicularly thereto, cover means between said lamp and said opening for preventing direct light radiation from said lamp to said element, and means disposed in said housing opposite to said opening and along said rear wall for reflecting light from said lamp through said opening.

2. An exposure device according to claim 1 and comprising partitions disposed between and substantially parallel to said side walls to prevent scattering of reflected light through said opening.

3. An exposure device according to claim 2, said partitions and the inner sides of said side walls being provided with mat black surfaces.

4. An exposure device according to claim 1, 2, or 3, said reflecting means comprising a diffusely light-reflective surface over at least a major portion of the area of said rear wall.

5. An exposure device according to claim 5, said reflecting means comprising a protruding rear wall portion disposed opposite said lamp and having oppositely sloped specular surfaces for directing light from said lamp toward opposite ends of said housing and, on said rear wall in the direction away from each of said specular surfaces, a diffusely reflecting surface portion lying substantially parallel to said opening and a diffusely reflecting substantially flat end surface lying at an obtuse angle to said surface portion and in the path of reflections from the related specular surface.

6. An exposure device according to claim 5 and comprising a partition disposed substantially midway between and parallel to said side walls along each said end surface of prevent scattering of light reflected by said end surfaces.

7. An exposure device according to claim 6, said partitions and the inner sides of said side walls being provided with mat black surfaces.

8. An exposure device according to claim 1, 2, 3, 5, 6, or 7, said cover means comprising an upwardly open trough-like partition extending parallel to said lamp and along opposite sides thereof in position to block off direct radiation of said lamp from substantially the entire area of said opening.

9. An exposure device according to claim 1, 2, 3, 5, 6, or 7, said opening being rectangular and being formed in a rectangular mask at the front of said housing.

* * * * *